United States Patent

[11] 3,616,179

| [72] | Inventors | Frank P. McCombs<br>Granville;<br>James C. Sullivan, Newark, both of Ohio |
|---|---|---|
| [21] | Appl. No. | 698,724 |
| [22] | Filed | Jan. 18, 1968 |
| [45] | Patented | Oct. 26, 1971 |
| [73] | Assignee | Owens-Corning Fiberglas Corporation |

[54] GLASS FIBER PRODUCT BONDED WITH TERPOLYMER COMPRISING PHENOL FORMALDEHYDE-UREA FORMALDEHYDE CONDENSATION PRODUCT
12 Claims, No Drawings

[52] U.S. Cl. ................................................ 161/170,
156/62.4, 156/335, 161/193, 161/198, 260/51.5,
260/840
[51] Int. Cl. ........................................................ B32b 17/10
[50] Field of Search............................................ 260/840,
51.5; 117/126, 2 GR; 264/128; 156/62.4, 324,
331, 335; 161/193, 198, 170

[56] References Cited
UNITED STATES PATENTS

| 1,973,050 | 9/1934 | Crump | 260/840 X |
| 2,184,575 | 12/1939 | Beutner | 260/840 X |
| 2,315,087 | 3/1943 | Cuvier | 260/840 |
| 2,500,054 | 3/1950 | Anthony et al. | 260/51.5 X |
| 3,215,585 | 11/1965 | Kneipple | 156/62.4 X |
| 3,276,928 | 10/1966 | Pearson et al. | 156/62.4 |
| 3,306,864 | 2/1967 | Lang et al. | 260/840 X |
| 3,337,669 | 8/1967 | Shannon et al. | 264/121 |
| 3,380,877 | 4/1968 | Smucker et al. | 156/329 X |

*Primary Examiner*—John T. Goolkasian
*Assistant Examiner*—D. J. Fritsch
*Attorneys*—Staelin & Overman and Daniel D. Mast

ABSTRACT: A new and improved resinuous binder used in the formation of siliceous batts has been developed by a process comprising the steps of charging a base mix of formaldehyde and phenol into a reactor in the presence of a catalyst, reacting the mixture to a stage wherein some free formaldehyde remains, charging the reactor with raw urea, reacting the combined mixture in the presence of the catalyst, cooling the mixture, neutralizing with acid, and adding subsequently thereto, oil, silane, and water.

GLASS FIBER PRODUCT BONDED WITH TERPOLYMER COMPRISING PHENOL FORMALDEHYDE-UREA FORMALDEHYDE CONDENSATION PRODUCT

TERPOLYMER BINDER COMPOSITION of which the following is a specification.

This invention relates to binders employed in the production of siliceous batts and more specifically to the production of phenolic resins, which when combined with the conventional additives to form a binder, enhance the physical properties of the siliceous batts.

U.S. Pat. No. 3,337,669 is exemplary of how binders are combined with fibers to form an integral product. Specifically therein is a graphic explanation of fiber formation, binder application, consolidation of the fibers into a loosely packed mass on a foraminous conveyor, and curing of the binder in situ on the fibrous mass. The binders of the present invention are applied with the apparatus shown.

The resinous binders used in the formation of batts must primarily be water dilutable and nonpunking* and possess high application efficiency. Binders used heretofore, or this purpose, have included resins comprising a phenol formaldehyde partial condensation product, a phenol-melamine-formaldehyde partial condensation product and a phenol-urea-formaldehyde partial condensation product. Particular problems are, however, present when the above resins are used as the bonding material in binders for the production of mats, batts, etc. Among these problems are poor "punk" resistance, poor application efficiency, nonuniform cure of the binder which results in "spots" of precure binder that decreases the tensile strengths of the batts, precure problems, and environmental control problems (air and water pollution).

*The term "punking" as used herein, and in the art, refers to the comparatively rapid oxidation of the binder, with generation of heat, but without flame.

All of the above-mentioned problems are solved or improvement made thereon when the products are produced according to the concepts of our invention, hereinafter discussed in greater detail.

The present invention is based upon our discovery that a particular phenol formaldehyde-urea formaldehyde partial condensation product, when used in the formulation of a binder composition for use with glass fibers, imparts substantially improved punk resistance and application efficiency, uniform cure of the binder, increased tensile strengths, and substantially reduces air and water pollution.

Among the advantages in using our resin as bonding material in a binder composition are: (1) a product is produced possessing better properties at a substantial economic savings, (2) the free phenol content is lowered because of a higher mol ratio of formaldehyde to phenol in the initial reaction, made possible by a subsequently controlled reaction between urea and formaldehyde, (3) more urea is tied up in the urea formaldehyde reaction because of the controlled reaction, rather than with a simple raw urea addition which depends upon oven heat to cross link with formaldehyde, and (4) improved application efficiency and wet tensile strength, all of which contribute to improve the environmental control problems that are inherent when resins of this type are used.

It is therefore an object of this invention to provide an improved binder composition for use with glass fibers.

It is another object of the present invention to provide an improved terpolymer partial condensation composition, which when heated will proceed to a uniform, final cured stage on the finished product.

It is still another object of the invention to provide an improved article which is a mass of haphazardly arranged glass fibers bonded together at points of contact by a binder comprising an improved terpolymer partial condensation composition.

It is a further object of the invention to provide a method for producing a binder having an approximate formaldehyde to phenol plus urea mol ratio of 1.1/1.

Other objects and advantages will be apparent from the description which follows, which is intended only to illustrate and disclose, and not to limit, the invention.

It has been discovered that by increasing the mol ratio of formaldehyde to phenol in the initial reaction and by charging raw urea to the same reactor wherein the initial reaction took place and reacting the urea undercontrolled conditions, many problems that have heretofore existed in the art have been solved. By this method the urea reacts with the excess formaldehyde from the initial reaction and proceeds to the "B" stage. Moreover, the higher mol ratio in the initial reaction allows more phenol to be cross linked with the formaldehyde, thereby reducing the amount of free phenol in the system to less than 1.0 percent, whereas in a raw urea addition which is not reacted undercontrolled conditions, the free phenol content is more than 1.5 percent because of the lower initial mol ratio of formaldehyde to phenol therein. This difference in percentage of free phenol means that, on a large volume basis, environmental control problems are greatly reduced.

Instead of the urea being simply added to form part of the binder composition and relying on the heat in the curing ovens to react the urea with the formaldehyde, it has been discovered that higher application efficiencies and wet tensile strengths are obtained when the urea is controllably reacted with the formaldehyde, for 10–15 minutes at 150° F. after the urea has been added over a 90-minute period at 150°–160° F. The reaction temperature is critical because if the mixture is reacted outside of the range, the water dilute of the mixture is adversely affected. With this control in the urea formaldehyde part of the reaction, more urea and formaldehyde are tied up thereby abating the environmental control problem that existed heretofore. Prior to now the method used to introduce urea into the phenolic system was by a "cold cut" process, wherein the urea was simply added to a holding tank containing the phenolic composition without being reacted undercontrolled conditions. Other elements were then added to the holding tank to establish the final binder composition, but this method had a number of disadvantages. Among these disadvantages were (1) the lack of substantial cross linking between the urea and formaldehyde, (2) "wet spots" on the finished batt product, caused by incomplete cure of the raw urea, (3) poor application efficiency of the binder to the batt product, and (4) free phenol and unreacted formaldehyde and urea went up the effluent stack and down the waste drain.

According to the invention, a method for producing an aqueous dispersion of a phenolic condensation product is provided. This method includes the steps of reacting phenol and an aldehyde in a reactor in the presence of a barium catalyst to reduce the free formaldehyde of the mixture from about 32–38 percent to about 16–18 percent, the loss in free aldehyde being attributed to that which has reacted with the phenol, reacting subsequently therewith, urea which is charged to the same reactor over a timespan of approximately 1–1½ hours at 150° F. and reacted for 10–15 minutes at 150° F., cooling the resultant mixture to 100° F. or lower, neutralizing said resultant mixture with a mineral acid, preferably $H_2SO_4$ to adjust the pH to a range of 6.7–6.8, heating the resultant mixture for 2 hours at 125° F. to improve wet tensile strength thereof,* cooling to room temperature and adding the conventional elements of silane (0.1–1.0 percent on resin solids), lubricant (0.5–8.0 percent on resin solids) and water (until desired binder solids of 5–30 percent is attained) to make up the binder system. Vinsol, an Extracted Pinewood Pitch, may be added to the binder composition to match the present color properties of ceiling board.

*When the cooling step, prior to neutralization, is accomplished within one-half hour, this additional heating for 2 hours at 125° F. is necessary to maintain wet tensile strength values. However, if the cooling step requires 2 hours or more, then no additional heating step is required after neutralization.

Lubricants used in the binder composition of our concept comprise a hydrocarbon oil emulsified in water. The preferred lubricants were found to be a 100 percent nonionic octylphenoxypolyethoxyethanol, and a 60 percent concentrated anionic synthetic petroleum sulfonate, molecular weight of 450, cut in oil.

The mol ratio of formaldehyde to phenol determines proper cure time, wet tensile strength,* and application efficiency. The controlled urea reaction with the formaldehyde makes it possible to increase the mol ratio of formaldehyde to phenol, because with a controlled reaction there is more cross linking between the urea and the formaldehyde. The combination of the higher mol ratio and the increased cross linking between the urea and formaldehyde improves the above properties, and provides improved punk resistance and uniform cure of the product, and greatly abates environmental control problems.

*The measurement of tensile strengths (wet and dry) involves mixing 36.0 grams of 50 percent solids resin with 1.80 grams of a 10 percent solids solution of ammonium sulfate. Then the pH of the mix is raised to 8.0 or above with ammonium hydroxide. To this mixture a mixture of 4.0 grams of water and 0.18 grams of a 10 percent silane solution made by Dow-Corning (Z-6024) is added thereto, and the resulting composition is mixed with 582.0 grams of clean, washed, small beads of soda-lime glass to produce a molding composition. The molding composition is molded into the form of a "dogbone mold" by preheating the mold to 425° F. and curing therein for 7 minutes at 425° F. After cure and separation from the mold, the dogbones that are produced are tested for wet tensile strength, by placing the dogbone in a relative humidity cabinet at 100 percent relative humidity, 50° C. for 16 hours, and dry tensile strength by leaving these samples exposed to room temperatures. After 16 hours the tensile strengths are determined on a Scott Tester or Instron unit. Preferably, the wet tensile strength values are 600 p.s.i. or better and the dry tensile strength values are 800 p.s.i. or better.

The amount of raw urea that is charged to the reactor containing the initial reaction of formaldehyde and phenol is determined on the basis of the desired wet tensile strength values on the finished resin. This is because the mol ratio of free formaldehyde to urea in the inventive concept is 0.7–0.8 mols below the theoretical value of 1.5–1.6/1, which Carlton Ellis in his book entitled "The Chemistry of Synthetic Resins" (pages 581–584) describes as the minimum ratio in order for reaction to occur; therefore it was necessary to look to wet tensile strength for guidance. However, when the final resin mixture is cured on the glass wool pack, formaldehyde and water are released from mono and dimethylolurea in the resin and additional water is released from methylol phenol therein. The excess urea in the resin system acts as a scavenger or sponge to absorb the released formaldehyde and further reacts therewith. The above is proven by the high wet tensile strengths of the resin, which is a function of the degree of reaction of the system.

Glass fibers are produced by flowing streams of fused materials through small orifices and drawing out the streams at speeds capable of attenuating said materials into fibers of desired diameters, associating a binder composition including a polymeric partial condensation product with the fibers in a forming hood before they are projected onto the conveyor, projecting the fibers and the binder composition onto a foraminous conveyor, and heating the mass of fibers and binder in ovens until the binder is converted, in situ, into a hardened, infusible condition.

Materials produced from the above method have found widespread commercial use in the thermal and acoustical markets and also in the decorative field. Examples of some of these products are ceiling board, acoustical tile, formboard, roof deck, duct, molded pipe insulation, etc.

The heating of the pack or mass of fibers and associated binder is preferably accomplished through a series of ovens, the first of which is approximately 50° F. lower in temperature than the rest of the ovens in the series. This lower temperature in the first oven is a safeguard against precure of the binder on the wool pack. The compression of the pack is still another safeguard against precure of the binder.

It must be pointed out that when a precure problem arises, it is usually because of urea in the system, and as a result, hard, nonflowing and hence nonbonding specks are formed. Therefore the amount of binder which is actually available for bonding is reduced, thereby decreasing the quality of the bond. To alleviate the situation by increasing the binder content on the batt through higher application efficiencies to ensure adequate bonding, the tendency to punk also decreases even though punking is roughly proportional to binder content since the nitrogen molecules from the urea inhibits punking.

Therefore the mol ratio of formaldehyde/phenol/urea must be determined in regard to the desired cure time, as the latter is a function of the former.

The method of producing a phenolic binder for application to glass fibers according to our concept is best represented when compared to the method heretofore used.

| OLD METHOD | NEW METHOD |
|---|---|
| charge reactor with phenol and formaldehyde to produce a phenol formaldehyde partial condensation resole in the presence of a catalyst | charge reactor with phenol and formaldehyde to form a phenol formaldehyde partial condensation resole in the presence of a catalyst |
| react until free formaldehyde is reduced to 5.5–6.0 percent | react until free formaldehyde is reduced to 16–18 percent |
| to a binder holding tank add the resole, and then add urea | charge urea in same reactor in presence of the catalyst and react to form a urea formaldehyde partial condensation resole |
| add thereto (NH$_4$)$_2$SO$_4$ plus NH$_3$$^+$ to obtain a pH of 8.5–9.0 | |
| add water, silane, and oil | cool resultant phenol formaldehyde-urea formaldehyde product |
| put the finished binder in spray unit for application to the fibers | neutralize with acid to obtain a pH of 6.7–6.8 |
| | add water, silane and oil |
| | put the finished binder in spray unit for application to the fibers |

Our phenol formaldehyde-urea formaldehyde systems give 3–10 percent better application efficiency.* It is believed that this efficiency is achieved because the resin exhibits cationic characteristics, i.e., the resin is readily attracted to the glass. Also, because the molecule of the phenol formaldehyde-urea formaldehyde system is larger than the phenol formaldehyde molecule alone, the application efficiency is thereby improved. Application efficiencies of binder to fiber are preferably 70 percent or better. U.S. Pat. No. 2,653,473 discloses an apparatus for the determination of application efficiency.

*The term "application efficiency" or more correctly, cone efficiency, is used herein, and in the art, to refer to the amount of resin solids deposited into a cone by spraying resin into the cone, curing the resin therein and calculating the efficiency by the expression:

$$E = \frac{\text{weight of resin and cone} - \text{weight of cone}}{\text{sp. gr. of resin} \times \text{weight of resin solids}} \times 100$$

The wet tensile strength of the resultant resin when combined with glass fibers is increased by the addition of a silane thereto (0.1–1.0 percent on the resin solids). The preferred silane was found to be an amino silane having a molecular structure represented by the following: H$_2$N-CH$_2$-CH$_2$-NH-CH$_2$-CH$_2$-Si(OC$_2$H$_5$)$_3$. Although this silane is preferred, other amino silanes have been found to be satisfactory, e.g., gamma-Aminopropyltriethoxysilane, gamma-Methacryloxypropyltrimethoxysilane, gamma-Glycidoxypropyltrimethoxysilane, N-bis(beta-Hydroxyethyl)gamma-aminopropyltriethoxysilane, N-Beta-(Aminoethyl)-gamma-aminopropyltrimethoxysilane, beta-(3,4-Epoxycyclohexyl)-ethyltrimethoxysilane, Vinyl-tris(beta-methoxyethoxy)silane, Vinyltrichlorosilane, Vinyltriethoxysilane, Vinyltriacetoxysilane, N-(Dimethoxymethylsilylisobutyl)ethylenediamine, Methyltrimethoxysilane, Phenyltrimethoxysilane, Di methyldimethoxysilane, Methylphenyldimethoxysilane, Diphenyldimethoxysilane, gamma-Chloropropyltrimethoxysilane, trimethylmercaptotrimethoxysilane, and methyl-3[3(trimethoxysilzlpropyl)2-aminoethyl-amino]propionate. It is believed that this particular silane, having two amine groups thereon, helps to give additional properties to the resin because not only is there compatibility between the glass fibers and the resin, but there is also coordination between the silane and the resin. Silane additions of 0.25 percent based on the resin solids have given excellent results.

The catalyst or condensing agent used to produce a terpolymer condensation product includes the more commonly used alkali metal hydroxides and alkaline earth hydroxides. It is preferable to use a barium condensing agent, such as barium oxide, barium monohydrate or barium octahydrate, but sodium hydroxide alone and ammonium hydroxide in combination with a barium catalyst work well. It is sometimes desirable to use organic compounds, such as diethanolamine and triethanolamine in combination with a barium catalyst as the condensing agent. These and others and the amounts required will hereinafter be discussed in greater detail.

The mol ratio of the formaldehyde to phenol in the initial reaction of the invention is from about 2.7/1 to about 4.2/1. This initial reaction is accomplished by heating the constituents in a reactor in the presence of a condensing agent until the free formaldehyde has been reduced from about 32–38 percent to about 16–18 percent. The preferred temperature in this heating step lies between 100–150° F.

Great care is necessary in adjusting the pH of the final reaction mixture between the narrow range of 6.7 and 6.8. If the final reaction mixture falls below 6.7, the wet tensile strength of the product is not within the desired range of from 525–800 p.s.i. If the final reaction mixture goes above a pH of 6.8, this too will deleteriously affect the wet tensile strength and also precipitate "precure" problems in the forming hood where the fibers are formed and sprayed with binder and on the foraminous conveyor. Because heat is given off during the neutralization step, cooling of the reaction mixture is usually preferred prior to the making of a pH adjusting with a mineral acid.

The following examples are presented solely for the purpose of further illustrating and disclosing the invention and are in no way to be construed as limitations thereon.

EXAMPLE I

A preferred formulation for the formation of a terpolymer partial condensation resole is as follows:

| Ingredients | Weight (lbs.) | Mols | Mol Ratio |
| --- | --- | --- | --- |
| Formaldehyde (52% solids) | 425.0 | 7.37 | 4.1 |
| Phenol (USP Grade) | 169.2 | 1.8 | 1.0 |
| Barium Monohydrate | 16.9 | | |
| Urea (100% solids) | 294.0 | 4.9 | 2.7 |

The mol ratio of formaldehyde to phenol plus urea in the resulting mixture is 1.1/1. The procedure for forming the resole is:

A reactor is charged with phenol, formaldehyde and barium monohydrate, the reactor being equipped with a temperature regulator and a reflux condenser. The temperature is held at 110° F. for approximately 1 hour, after which the temperature is raised to 164° F. and reacted until a free formaldehyde content of 16–18 percent by weight of the total weight of formaldehyde and phenol is obtained. This reaction continues for about 90 minutes. To the same reactor, urea is charged thereto and reacted for 45 minutes at 140° F. In order to reduce cure time and increase water dilutability of the resultant mixture, an amine such as diethanolamine may be added thereto. Upon such amine addition, reaction is continued to a stroke cure time of about 130 seconds and a film cure time* of about 215 seconds. The reactants are cooled to at least 100 °F. and neutralized to a pH of from 6.7–6.8.

*The stroke cure time and film cure time of thermosetting resins, specifically ureas and phenolics, is measured by noting the interval between the time a sample is placed on a Thermoelectric cure plate and the time at which the resin pulls off the cure plate in strings and films. The plate is preheated to 150°C., and the stroking is done with a 4-inch spatula having a ⅝-inch wide blade.

EXAMPLES II–V

Formaldehyde and phenol, at a mol ratio of 2.7/1 are charged into a reactor. Barium octahydrate is added as the condensing agent. The reaction is carried out at 110° F. for 3 hours; the temperature is then raised to 140° F. and held for 5 hours after which the mixture is divided into four aliquot portions and put in separate reactors. Each reaction is continued at 140° F. with the addition of 70, 80, 90, and 100 percent urea (50 percent solids) to each reactor. The urea addition is based on phenol-formaldehyde solids of 50 percent. The phenol formaldehyde mixtures plus the indicated percentages of urea are reacted at various times and temperatures, as indicated, so that each mixture exhibits a water dilute of at least 10–1. 70 percent urea is reacted 20 minutes at 140° F. to a 10–1 water dilute, and 80 percent urea after 20 minutes at 140° F. has infinite dilutability in water, and 90 percent urea after 60 minutes at 140° F. has infinite dilutability in water, and 100 percent urea after 75 minutes at 140° F. has infinite dilutability in water.

The reactants are then cooled over a 2-hour period and neutralized to a pH of from 6.7–6.8.

Following are the formulations for the above procedure:

EXAMPLE II

| Ingredients | Weight (lbs.) | Mols | Mol Ratio |
| --- | --- | --- | --- |
| Formaldehyde (52% solids) | 467.1 | 8.1 | 2.7 |
| Phenol (USP Grade) | 282.0 | 3.0 | 1.0 |
| Barium Octahydrate | 14.1 | | |
| Urea (50% solids) | 360.0 | 3.0 | 1.0 |

The mol ratio of formaldehyde to phenol plus urea in the resulting mixture is 1.35/1.

EXAMPLE III

| Ingredients | Weight (lbs.) | Mols | Mol Ratio |
| --- | --- | --- | --- |
| Formaldehyde (52% solids) | 467.1 | 8.1 | 2.7 |
| Phenol (USP Grade) | 282.0 | 3.0 | 1.0 |
| Barium Octahydrate | 14.1 | | |
| Urea (50% solids) | 432.0 | 3.6 | 1.2 |

The mol ratio of formaldehyde to phenol plus urea in the resulting mixture is 1.23/1.

EXAMPLE IV

| Ingredients | Weight (lbs.) | Mols | Mol Ratio |
| --- | --- | --- | --- |
| Formaldehyde (52% solids) | 467.1 | 8.1 | 2.7 |
| Phenol (USP Grade) | 282.0 | 3.0 | 1.0 |
| Barium Octahydrate | 14.1 | | |
| Urea (50% solids) | 720.0 | 6.0 | 2.0 |

The mol ratio of formaldehyde to phenol plus urea in the resulting mixture is 0.9/1.

EXAMPLE V

| Ingredients | Weight (lbs.) | Mols | Mol Ratio |
|---|---|---|---|
| Formaldehyde (52% solids) | 467.1 | 8.1 | 2.7 |
| Phenol (USP Grade) | 282.0 | 3.0 | 1.0 |
| Barium Octahydrate | 14.1 | | |
| Urea (50% solids) | 828.0 | 6.9 | 2.3 |

The mol ratio of formaldehyde to phenol plus urea in the resulting mixture is 0.82/1.

EXAMPLE VI

Formaldehyde (52 percent solids) and phenol (U.S.P. Grade), at a mol ratio of 3.37/1 are charged into a reactor equipped with a temperature regulator and a reflux condenser, in the presence of barium monohydrate catalyst. The temperature is held at 110° F. for X 1 hour, after which the temperature is raised to 164° F. and reaction continued until free formaldehyde of 16–18 percent by weight of the total weight of formaldehyde and phenol is obtained. That reaction consumes approximately 90 minutes. Urea is then charged to the same reactor and reacted for 45 minutes at 140° F. Subsequently, diethanolamine is added to the mixture in the reactor and reacted until a film cure time of 205–215 seconds is reached. Following is the formulation used in the above described precedure to yield a mixture having a formaldehyde to phenol plus urea mol ratio of 1.05/1:

| Ingredients | Weight (lbs.) | Mols | Mol Ratio |
|---|---|---|---|
| Formaldehyde (52% solids) | 774.0 | 13.4 | 3.37 |
| Phenol (USP Grade) | 376.0 | 4.0 | 1.0 |
| Barium Monohydrate | 18.8 | | |
| Urea (50% solids) | 526.0 | 4.4 | 1.1 |
| Diethanolamine | 22.0 | 0.2 | 0.05 |

EXAMPLE VII

Formaldehyde and phenol, at a mol ratio of 4.1/1 are charged into a reactor equipped with a temperature regulator and a reflux condenser. The refractive index and percentage free formaldehyde on the mixture are established prior to reaction to be 1.4317–1.4327 and 36.6 percent respectively. The temperature of the reactor is adjusted and maintained at 110° F. Barium oxide is dissolved in water and added to the reactor over a 60-minute period while maintaining the temperature at 110° F. after 1 hour from the start of the addition of the barium oxide to the reactor, wherein the temperature is maintained at 110° F., the refractive index, percent free formaldehyde and pH are determined and the temperature is raised to 164° F. over an 80-minute period. The contents of the reactor are checked every 15 minutes for free formaldehyde content, until it reads between 15.8–16.0 percent by weight of the total weight of formaldehyde and phenol. When the free formaldehyde content reaches 15.8–16.0 percent the temperature within the reactor is lowered and maintained at 150°–155° F., and urea is added thereto over a 90-minute period and then reacted for 10 minutes at 143° F. The reaction mixture is then cooled over a 30 minute period to at least 100° F. and neutralized with 10 percent sulfuric acid to a pH of between 6.8–7.0. The temperature of the reaction mixture is then raised to 125° F. and reacted to a stroke cure time of 125–130 seconds and a film cure time of 210–230 seconds. The resultant mixture yields a formaldehyde to phenol plus urea mol ratio of 1.1/1. Following is the formulation used in the above described procedure:

| Ingredients | Weight (lbs.) | Mols | Mol Ratio |
|---|---|---|---|
| Formaldehyde (52% solids) | 481.5 | 8.35 | 4.09 |
| Phenol (USP Grade) | 191.7 | 2.04 | 1.0 |
| Barium Oxide | 16.0 | | |
| Urea (100% solids) | 333.1 | 5.55 | 2.72 |
| Sulfuric Acid | 34.0 (includes water) | | |

EXAMPLE VIII

Another formualtion within our concept is as follows:

| Ingredients | Weight (lbs.) | Mols | Mol Ratio |
|---|---|---|---|
| Formaldehyde (45% solids) | 122.8 | 1.842 | 4.09 |
| Phenol (USP Grade) | 42.3 | 0.450 | 1.0 |
| Barium Monohydrate (technical grade) | 4.2 | | |
| Urea (Prilled 100% solids) | 73.5 | 1.225 | 2.72 |
| Sulfuric Acid (20%) | 7.5 | | |

The procedure for making the above resin is the same as described in example VII, and the resultant mixture yields a formaldehyde to phenol plus urea mol ratio of 1.1/1.

EXAMPLE IX

| Ingredients | Weight (lbs.) | Mols | Mol ratio |
|---|---|---|---|
| Formaldehyde (52% solids) | 485.0 | 8.4 | 4.2 |
| Phenol (USP grade) | 188.0 | 2.0 | 1.0 |
| Barium oxide | 15.6 | | |
| Water } Slurry | 80.0 | | |
| Urea (100% solids) | 333.0 | 5.5 | 2.75 |
| Sulfuric acid (10%) | 72.0 | | |

The procedure for forming a resole having the above composition consists of charging a kettle with the indicated amounts of formaldehyde and phenol. The temperature of the mixture is raised to 110° F. and maintained for approximately 1 hour during which time barium oxide, slurried in water, is added gradually thereto. The temperature of the mixture is gradually raised to 164° F. over a 70-minute period. The reactants are held at this temperature until a free formaldehyde content of 16–18 percent by weight of the total weight of formaldehyde and phenol is obtained. The reaction requires about 15 minutes at the stated temperature. Urea is then added to the mixture in the kettle over a 70-minute time period wherein the temperature of the mixture drops to 150°–155° F. at the end of the urea addition. The resin is then cooled to 90°–95° F. in 2 hours and is neutralized with a 10 percent solution of sulfuric acid to a pH of 6.7–6.8. The mol ratio of formaldehyde to phenol plus urea in the resulting mixture is 1.12/1.

EXAMPLE X

| Ingredients | Weight (lbs.) | Mols | Mol ratio |
|---|---|---|---|
| Formaldehyde (52% solids) | 485.0 | 8.4 | 4.2 |
| Phenol (USP grade) | 188.0 | 2.0 | 1.0 |
| Polyglycol | 40.0 | | |
| Barium oxide | 15.6 | | |
| Water } Slurry | 80.0 | | |
| Urea (100% solids) | 333.0 | 5.5 | 2.75 |

The procedure for making the above terpolymer partial condensation resole is the same as described in example IX except that polyglycol is charged with he formaldehyde and phenol. It has also been found that the polyglycol, when added just before the urea addition or even after the urea reaction, provides good flow-out properties to the resole. The purpose of the polyglycol addition is to increase the application efficiency, since with the presence of polyglycol the film of binder on the glass fibers has better flow-out properties and foaming of the binder as it passes through the curing ovens is prevented.

The mol ratio of formaldehyde to phenol plus urea in the resulting mixture is 1.12/1.

Following is a table of physical properties exhibited by Examples I-X, wherein at least five runs were conducted for each formulation.

| Property | I | II | III | IV | V | VI | VII | VIII | IX | X |
|---|---|---|---|---|---|---|---|---|---|---|
| Stroke cure, seconds | 125-135 | 145-160 | 145-160 | [1] 140-150 | [1] 135-145 | 120-130 | 120-125 | 125-130 | 95-115 | 120-130 |
| Film cure, seconds | 210-230 | 230-250 | 205-215 | [2] 210-230 | [2] 215-230 | 205-225 | 210-215 | 210-230 | 210-215 | 205-215 |
| Wet tensile strength, p.s.i | 550-600 | 550-600 | 550-600 | 750-800 | 525-550 | 550-600 | 600-625 | 600-640 | 625-650 | 525-550 |
| Dry tensile strength, p.s.i | 750-800 | 850-900 | 800-850 | 1,025-1,075 | 700-750 | 750-800 | 800-850 | 800-850 | 850-900 | 800-850 |
| Application efficiency, percent | 68±1 | 70±1 | 69.8±1 | 68±1 | 66.0±1 | 71.0±1 | 75.0±1 | 75.0±1 | 77.0±1 | 70.0±1 |
| Solids, percent | 58±0.5 | 53±1 | 52.5±1 | 52±1 | 51.5±1 | 59.8±1 | 57.5±1 | 60.0±0.5 | 58.0±0.5 | 58.5±1 |

[1] 3% formaldehyde (52%) added on solids basis.
[2] 5% formaldehyde (52%) added on solids basis.

The results posted in the table show good wet and dry tensile strengths and extremely good application efficiencies, while maintaining stroke and film cure within predetermined specifications of 90-120 seconds and 200-250 seconds respectively.

It will be apparent from the foregoing that we have provided a new and improved resinous binder composition which when used in the production of glass fiber batts, mats, boards, etc., improves the application efficiency of the binder to the glass fibers, and upon curing the binder in association with the glass fibers, an improved, uniformly cured product results, while at the same time greatly abating the inherent environmental control problems associated with the production hereof.

We claim:

1. A method of preparing a bonded glass fiber product comprising the steps of:
   a. forming glass fibers from molten streams of glass;
   b. combining the glass fibers with a heat curable, aqueous binder composition, said binder composition being formed by
      1. charging a reactor with a mixture of formaldehyde and phenol in a mol ratio of formaldehyde to phenol ranging from 2.7-4.2/1;
      2. reacting the mixture in the presence of a condensing agent until it has a free formaldehyde content of 16-18 percent by weight of the total weight of formaldehyde and phenol, wherein a first reaction product is formed;
      3. charging urea to the reactor wherein its contents comprise a mol ratio of formaldehyde/phenol/urea ranging from 2.7-4.2/1/1.5-3.0, and wherein the mol ratio of free formaldehyde to urea is from 0.5-1.5/1;
      4. reacting the urea with the free formaldehyde whereby a second reaction product is formed;
      5. cooling the reactor contents comprising the reaction products and neutralizing the reactor contents to stop the reaction short of completion;
      6. adding 0.5-8 percent by weight of a lubricant to the cooled reactor contents, based on the total weight of the first and second reaction products;
      7. adding 0.1-1.0 percent by weight of a silane to the cooled reactor contents, and the lubricant based on the total weight of the first and second reaction products;
      8. adding water to the cooled reactor contents, the lubricant and the silane, to dilute the binder to a solids of from 5 to 30 percent;
   c. consolidating the fibers and heat curable aqueous binder composition into a loosely packed mass on a foraminous conveyor;
   d. compressing the consolidated fibers on the foraminous conveyor; and
   e. curing the heat curable binder composition in situ on the glass fiber product.

2. The method as claimed in claim 1 wherein the step of compressing is conducted at temperatures ranging from 75°-200° F.

3. The method as claimed in claim 1 wherein the curing step is accomplished by passing the product through a series of temperature zones ranging from 400°-500° F., the first zone of which is 50° F. lower in temperature than the others.

4. The method as claimed in claim 1 wherein the condensing agent of step (b)(2) is selected from the group consisting of barium monohydrate, barium octahydrate, barium oxide, sodium hydroxide and combinations thereof with ammonium hydroxide, diethanolamine and triethanolamine. X 5. The product formed by the method as claimed in claim 1.

6. In a method of preparing a bounded glass fiber product comprising the steps of:
   a. forming glass fibers from molten streams of glass;
   b. combining the glass fibers with a heat curable aqueous binder composition;
   c. consolidating the fibers and heat curable aqueous binder composition onto a foraminous conveyor
   d. compressing the consolidating fibers on the foraminous conveyor; and
   e. curing the heat curable binder composition in situ on the glass fiber product, the improvement comprising combining the glass fibers with a heat curable aqueous binder composition, said binder composition being formed by
      1. charging a reactor with a mixture of formaldehyde and phenol in a mol ratio of formadldehyde to phenol ranging from formaldehyde 4.2/1;
      2. reacting the mixture in the presence of a condensing agent until it has a free formaldehyde content of 16-18 percent by weight of the total weight of formaldehyde and phenol, wherein a first reaction product is formed;
      3. charging urea to the reactor wherein its contents comprise a mol ratio of formaldehyde/phenol/urea ranging from 2.7-4.2/1/1.5-3.0, and wherein the mol ratio of free formaldehyde to urea is from 0.5-1.5/1;
      4. reacting the urea with the free formaldehyde whereby a second reaction product is formed;
      5. cooling the reactor contents comprising the reaction products and neutralizing the reactor contents to stop the reaction short of completion.

7. The method as claimed in claim 6 wherein the step of compressing is conducted at temperatures ranging from 75°-200b° F.

8. The method as claimed in claim 6 wherein the curing step is accomplished by passing the product through a series of temperature zones ranging from 400°-500° C., the first zone of which is 50° F. lower in temperature than the others.

9. The method as claimed in claim 6 wherein the condensing agent of step (b)(2) is selected from the group consisting of barium monohydrate, barium octahydrate, barium oxide, sodium hydroxide and combinations thereof with ammonium hydroxide, diethanolamine and triethanolamine.

10. The product formed by the method as claimed in claim 6.

11. In a method of preparing a bonded glass fiber product comprising the steps of:
   a. forming glass fibers from molten streams of glass;
   b. combining the glass fibers with a heat curable aqueous binder composition;
   c. consolidating the fibers and heat curable aqueous binder composition onto a foraminous conveyor;
   d. compressing the consolidated fibers on the foraminous conveyor and
   e. curing the heat curable binder composition in situ on the glass fiber product, the improvement comprising combining the glass fibers with a heat curable, aqueous binder composition, said binder composition being formed by
1. charging a reactor with a mixture of formaldehyde and phenol having a formaldehyde to phenol mol ratio of from 2.7-4.2/1 and a free formaldehyde content of from 32-38 percent by weight of the total weight of formaldehyde and phenol;
2. reacting the mixture in the presence of an alkaline earth hydroxide at a temperature of from 105°-115° F. for 55-75 minutes, to form a phenol formaldehyde partial condensation resole;
3. reacting the mixture additionally by raising the temperature to 150°-170° F. over a 70-90-minute period, until the free formaldehyde content is reduced to 16-18 percent by weight of the total weight of formaldehyde and phenol;
4. charging urea to the reactor wherein its contents comprise a free formaldehyde to urea mol ratio ranging from 0.5-1.5/1;
5. reacting the urea with the free formaldehyde over a time period of 80-100 minutes while holding the temperature of the reactor between 155°-165° F. during the first 70-75 minutes to form a urea-formaldehyde partial condensation resole;
6. cooling the reactor contents to at least 100° F.;
7. neutralizing the reactor contents with 10-20 percent sulfuric acid to a pH of from 6.7-6.8, whereby the partial condensation product comprising phenol formaldehyde and urea formaldehyde resoles have a stroke cure of from 125-130 seconds, a film cure of from 210-230 seconds and a water dilutability of at least 10-1.

12. The product formed by the method as claimed in claim 11.

* * * * *